(12) United States Patent
Li (10) Patent No.: US 8,654,667 B2
(45) Date of Patent: Feb. 18, 2014

(54) METHOD FOR DEMODULATING DATA AND DEMODULATING APPARATUS BASED ON A DOWNLINK TRANSMIT DIVERSITY MODE IN A LTE SYSTEM

(75) Inventor: Bin Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 277 days.

(21) Appl. No.: 13/148,095

(22) PCT Filed: Apr. 14, 2010

(86) PCT No.: PCT/CN2010/071755
§ 371 (c)(1), (2), (4) Date: Aug. 5, 2011

(87) PCT Pub. No.: WO2011/000235
PCT Pub. Date: Jan. 6, 2011

(65) Prior Publication Data
US 2011/0292827 A1    Dec. 1, 2011

(30) Foreign Application Priority Data

Jul. 3, 2009    (CN) .......................... 2009 1 0151598

(51) Int. Cl.
*H04W 4/00*    (2009.01)

(52) U.S. Cl.
USPC ........................................................ 370/252

(58) Field of Classification Search
USPC .......................................... 370/252, 330, 332
See application file for complete search history.

(56) References Cited

U.S. PATENT DOCUMENTS

2005/0094596 A1* 5/2005 Pietraski et al. ............... 370/329
2005/0174983 A1* 8/2005 Naguleswaran et al. ..... 370/347

(Continued)

FOREIGN PATENT DOCUMENTS

CN    101359954 A    2/2009
CN    101471757 A    7/2009

(Continued)

OTHER PUBLICATIONS

International Search Report, mailed Jul. 1, 2010, in counterpart International Patent Application No. PCT/CN2010/071755, 6 pgs.

(Continued)

*Primary Examiner* — Jae Y Lee
*Assistant Examiner* — Jean F Voltaire
(74) *Attorney, Agent, or Firm* — Brian J. Colandreo; Pamela K. Soggu; Holland & Knight LLP (57) ABSTRACT

A demodulating method and a demodulating apparatus at a receiver based on a downlink transmit diversity mode in a LTE system are provided by the present invention. The method includes: dividing received data from sub-carriers of each receiving antenna based on a transmit diversity mode into multiple groups of received data according to numbers of antennas of a transmitter and a receiver; performing an independent demodulation on each group of the multiple groups of received data separately according to a demodulation algorithm of two-port transmitting and single-port receiving, so as to obtain a corresponding group of demodulated data; and for multiple groups of demodulated data corresponding to same transmitted data, performing a maximum ratio combination on the multiple groups of demodulated data according to a channel condition corresponding to each group of the multiple groups of demodulated data, so as to obtain a corresponding final demodulated data value. The demodulating method and the demodulating apparatus of the present invention can ensure the performance of the system adopting the diversity algorithm in situations of various kinds of antenna configurations, reduce cost and the complexity of devices in a practical application, and is very easy for project implementation.

10 Claims, 4 Drawing Sheets

(56) References Cited

U.S. PATENT DOCUMENTS

| | | | |
|---|---|---|---|
| 2009/0034585 A1* | 2/2009 | Hua et al. | 375/130 |
| 2009/0097600 A1 | 4/2009 | Arambepola et al. | |
| 2009/0296591 A1* | 12/2009 | Urabe et al. | 370/252 |

FOREIGN PATENT DOCUMENTS

| | | |
|---|---|---|
| JP | 2008-079262 A | 4/2008 |
| JP | 2008-510386 A | 4/2008 |
| JP | 2008103795 A | 5/2008 |
| JP | 2008-520167 A | 6/2008 |

OTHER PUBLICATIONS

English translation of abstract of CN101359954, 1 pg.
English translation of abstract of CN101471757, 1 pg.
English translation of abstract of JP2008103795, 1 pg.
Office Action for Japanese Patent Application No. 2012-516488 issued Jul. 30, 2013. 2 pages.

* cited by examiner

METHOD FOR DEMODULATING DATA AND DEMODULATING APPARATUS BASED ON A DOWNLINK TRANSMIT DIVERSITY MODE IN A LTE SYSTEM

RELATED APPLICATIONS

The subject application is a U.S. National Stage application of International Application No. PCT/CN2010/071755, filed on 14 Apr. 2010, which claims the priority of Chinese Patent Application No.: 200910151598.3, filed on 3 Jul. 2009, the contents of which are herein incorporated by reference in its entirety.

FIELD OF THE INVENTION

The present invention relates to LTE (Long-Term Evolution) system field, and in particular to a method for demodulating data and a demodulating apparatus based on a downlink transmit diversity mode in a LTE system.

BACKGROUND OF THE INVENTION

Currently, the wireless communication technology is subjected to some limitations, such as limited bandwidth and transmission power, interference, signal attenuation, multipath effect, and Doppler effect caused by a higher moving speed of a user equipment. With a further deepening and development of investigation, the combination system of a wideband wireless mobile and a wireless access of future mobile communication becomes a hot research project currently, and a MIMO (Multiple Input Multiple Output) system is one of hot topics researched by people. The basic principle of the MIMO is to use a plurality of antennas at a transmitter, a receiver, or both the transmitter and the receiver, by a space-time processing technology, to take full advantage of independent fading characteristics among channels, so as to improve spectrum efficiency, communication quality and system capacity.

Space-time coding is the basis of the MIMO system, the space-time coding technology maps, according to a certain design rule, coding redundant information to a two-dimensional time-space plane as evenly as possible by taking advantage of an orthogonality or a quasi-orthogonality between a space domain and a time domain, so as to decrease the effect of a time-selective fading and a space-selective fading caused by a wireless multipath propagation, thus to achieve high speed data transmission with high reliability in wireless channels. Alamouti proposed a STBC (Space Time Block Coding) based on two transmission antennas in 1998; and since this solution can greatly improve the quality of receiving links in a fading channel, is easy to be realized and makes the complexity of the decoding of the receiver to be lower, it is adopted by protocols such as 3GPP ($3^{rd}$ Generation Partnership Project) and IEEE (Institute for Electrical and Electronic Engineers) 802.16. However, the coding solution of Alamouti requires that it is supposed a channel keeps constant at two time points, therefore, SFBC (Space Frequency Block Coding) is more stable in a fading environment compared with the STBC which can keep performance only in a low fading environment; and the SFBC, which is a multicarrier technology applied to neighboring sub-channels or neighboring carriers, is more suitable for being used in a LTE multicarrier modulating system based on an OFDM (Orthogonal Frequency Division Multiplexing) technology.

Figure 1A:
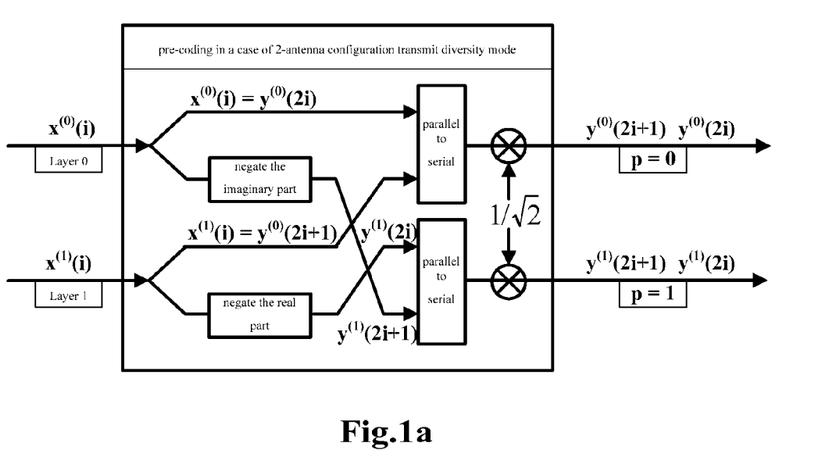
FIGS. 1*a* and 1*b* are block diagrams showing the principles of diversity transmission methods in a LTE wireless communication system under a 2-port situation and a 4-port situation respectively according to the prior art.
Figure 1B:
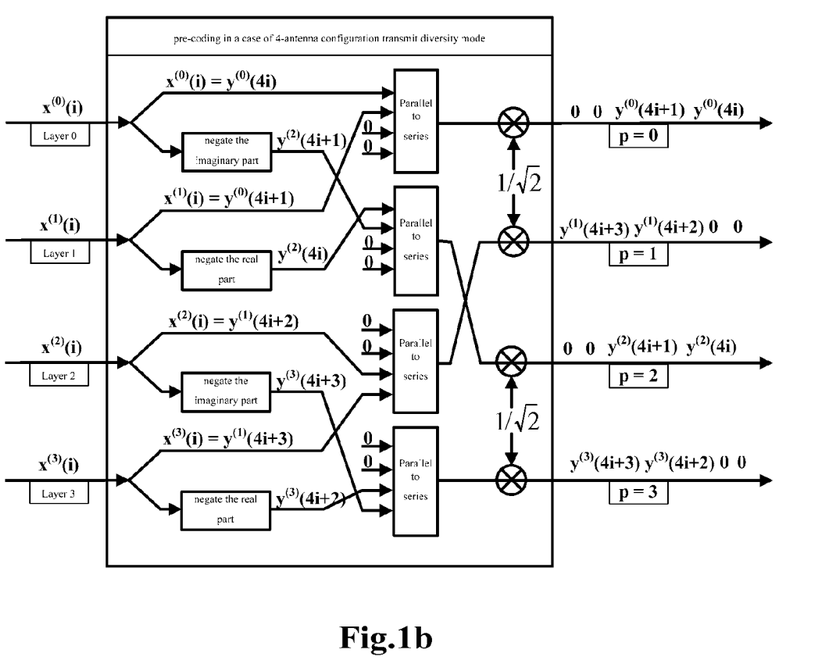

FIGS. 1a and 1b are block diagrams showing the principles of diversity transmission methods in a LTE wireless communication system under a 2-port situation and a 4-port situation respectively. Different from the situation in which a diversity gain is obtained without impairing data rate by using two antennas, when a transmit diversity mode is used by 4 transmission ports, N code elements need 2N sub-carriers, which results in a reduction in the data rate. In order to realize a full rate transmission in a transmit diversity mode of the LTE system via multiple ports, the protocols regulate that the downlink transmit diversity solution based on SFBC+FSTD (Frequency Switched Transmit Diversity) is employed for the 4-port situation. Therefore, if the traditional demodulating method based on the 2-port is directly applied to the 4-port mode, performance loss will occur; and if a method of directly inversing a coding matrix is used, the complexity of the downlink demodulation algorithm will increase sharply.

Therefore, it is necessary to provide a new solution to overcome shortcomings in the related art.

SUMMARY OF THE INVENTION

The object of the present invention is to provide a method for demodulating data and a demodulating apparatus based on a downlink transmit diversity mode in a LTE system, and in particular to provide a solution of a demodulation algorithm of a receiver, which is aimed to the SFBC+FSTD based transmit diversity algorithm employed for the downlink in a LTE communication system, thus the LTE system is enabled to ensure full rate data transmission based on a multiport transmit diversity mode, and to ensure corresponding diversity gain.

A method for demodulating data based on a downlink transmit diversity mode in a LTE system is provided according to one aspect of the present invention, and the method comprises following steps:

performing channel estimation on a downlink channel by using a cell reference signal, so as to obtain channel estimation values;

dividing received data from sub-carriers of each receiving antenna based on a transmit diversity mode into multiple groups of received data according to numbers of antennas of a transmitter and a receiver;

performing an independent demodulation on each group of the multiple groups of received data separately according to a demodulation algorithm of 2-port transmitting and single-port receiving, so as to obtain a corresponding group of demodulated data; and for multiple groups of demodulated data corresponding to same transmitted data, performing a maximum ratio combination on the multiple groups of demodulated data according to a channel condition corresponding to each group of the multiple groups of demodulated data, so as to obtain a final demodulated data value corresponding to the same transmitted data.

Preferably, the step of for multiple groups of demodulated data corresponding to same transmitted data, performing a maximum ratio combination on the multiple groups of demodulated data according to a channel condition corresponding to each group of the multiple groups of demodulated data comprises:

measuring signal-to-interference plus noise ratio (SINR) $SINR_i$ of each group of demodulated data according to the channel estimation values of the downlink channel, wherein i=1, ..., K, and K is the number of groups of the multiple groups of received data; and performing the maximum ratio combination on the multiple groups of demodulated data according to the signal-to-interference plus noise ratio $SINR_i$ corresponding to each group of demodulated data, so as to obtain the final demodulated data value corresponding to the same transmitted data.

Preferably, the maximum ratio combination is performed by the following formula:

$$\sum_{i=1}^{K} \lambda_i = 1$$

$$\lambda_i / \lambda_j = SINR_i / SINR_j,$$

wherein $\lambda_i$, $\lambda_j$ represent maximum combination coefficients of an $i^{th}$ and a $j^{th}$ groups respectively, i, j=1, . . . , K, and the obtained final demodulated data value corresponding to the same transmitted data satisfies:

$$[\tilde{S}_0 \; \tilde{S}_1]^T = \sum_{i=1}^{K} \lambda_i \cdot [\tilde{S}_{i,0} \; \tilde{S}_{i,1}]^T,$$

wherein $[\tilde{S}_0 \; \tilde{S}_1]^T$ represents the final demodulated data value corresponding to the same transmitted data, and $[\tilde{S}_{i,0} \; \tilde{S}_{i,1}]^T$ represents the $i^{th}$ group of demodulated data.

Preferably, the step of dividing the received data from sub-carriers of each receiving antenna based on the transmit diversity mode into the multiple groups of received data comprises:

classifying the data into K groups by classifying data from two neighboring sub-carriers of a same receiving antenna into one group, wherein $$K = M \cdot \frac{N}{2},$$

and N and M represent the numbers of the antenna of the transmitter and the receiver respectively.

Preferably, the signal-to-interference plus noise ratio $SINR_i$ of each group of demodulated data is determined by the following formula:

$$SINR_i = \frac{\|h_{11}\|^2 + \|h_{21}\|^2}{2\sigma^2},$$

wherein $h_{11}$ and $h_{21}$ are respectively the channel estimation values from a first transmission port and a second transmission port of a same group to a first receiving port, and $\sigma^2$ is interference plus noise power and set to be same for each group.

An apparatus for demodulating data based on a downlink transmit diversity mode in a LTE system is provided according to another aspect of the present invention, and the apparatus comprises:

a channel estimation unit, configured to perform a channel estimation on a downlink channel by using a cell reference signal;

a data grouping unit, configured to divide received data from each sub-carrier based on the transmit diversity mode of each receiving antenna into multiple groups of received data, according to numbers of antennas of a transmitter and a receiver;

an independent demodulation unit, configured to demodulate each group of the multiple groups of received data separately according to a demodulation algorithm of two-port transmitting and single-port receiving, so as to obtain a corresponding group of demodulated data; and a final demodulated data value setting unit, configured to, for multiple groups of demodulated data corresponding to same transmitted data, obtain a final demodulated data value corresponding to the same transmitted data according to a channel condition corresponding to each group of the multiple groups of demodulated data.

Preferably, the apparatus also comprises a signal-to-interference plus noise ratio (SINR) measurement unit, configured to measure signal-to-interference plus noise ratio $SINR_i$ of each group of demodulated data according to the channel estimation values of the downlink channel measured by the channel estimation unit, wherein i=1, . . . , K, and K is the number of the multiple groups of the received data, and wherein for the multiple groups of demodulated data corresponding to same transmitted data, the final demodulated data value setting unit performs a maximum ratio combination on multiple groups of demodulated data according to the $SINR_i$ corresponding to each group of demodulated data measured by the SINR measurement unit, so as to obtain the final demodulated data value corresponding to the same transmitted data.

Preferably, the final demodulated data value setting unit performs the maximum ratio combination operation by the following formula:

$$\sum_{i=1}^{K} \lambda_i = 1$$

$$\lambda_i / \lambda_j = SINR_i / SINR_j,$$

wherein $\lambda_i$ and $\lambda_j$ represent maximum ratio combination coefficients of an $i^{th}$ group and a $j^{th}$ group respectively, i, j=1, . . . , K, and the obtained final demodulated data value corresponding to the same transmitted data satisfies the following equation:

$$[\tilde{S}_0 \; \tilde{S}_1]^T = \sum_{i=1}^{K} \lambda_i \cdot [\tilde{S}_{i,0} \; \tilde{S}_{i,1}]^T,$$

wherein $[\tilde{S}_0 \; \tilde{S}_1]^T$ represents the final demodulated data value corresponding to the same transmitted data, and $[\tilde{S}_{i,0} \; \tilde{S}_{i,1}]^T$ represents a $i^{th}$ group of demodulated data.

Preferably, the step that the data grouping unit divides the received data from the sub-carriers based on the transmit diversity mode of each receiving antenna into the multiple groups of received data comprises:

classifying the data into K groups by classifying data from two neighboring sub-carriers of a same receiving antenna into one group, wherein $$K = M \cdot \frac{N}{2},$$

and N and M represent the numbers of the antenna of the transmitter and the receiver respectively.

Preferably, the SINR measurement unit determines the signal-to-interference plus noise ratio $SINR_i$ of each group of demodulated data by the following formula:

$$SINR_i = \frac{\|h_{11}\|^2 + \|h_{21}\|^2}{2\sigma^2},$$

wherein $h_{11}$ and $h_{21}$ are respectively the channel estimation values from a first transmission port and a second transmission port of a same group to a first receiving port, and $\sigma^2$ is interference plus noise power and set to be same for each group.

In the demodulating method and apparatus at the receiver in the case of multiple ports based on the downlink transmit diversity mode in the LTE system provided by the present invention, the channel estimation is performed on the downlink channel by the cell reference signal first, the received data from each sub-carrier of each receiving antenna is divided into groups according to the numbers of the antennas of the receiver and the transmitter, the demodulated data is obtained from each group of received data by a 2-port decoding method, and then the maximum ratio combination is performed on each group of demodulated data preferably by a SINR corresponding to the each group, thus the LTE communication system can improve the performance of the system by a space diversity technology when the transmission rate of the system is ensured.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The preferred embodiments of the present invention will be described in connection with drawings hereinafter. It is to be understood that the preferred embodiments described herein are merely used to describe and explain the present invention without limiting the same.

Figure 2:
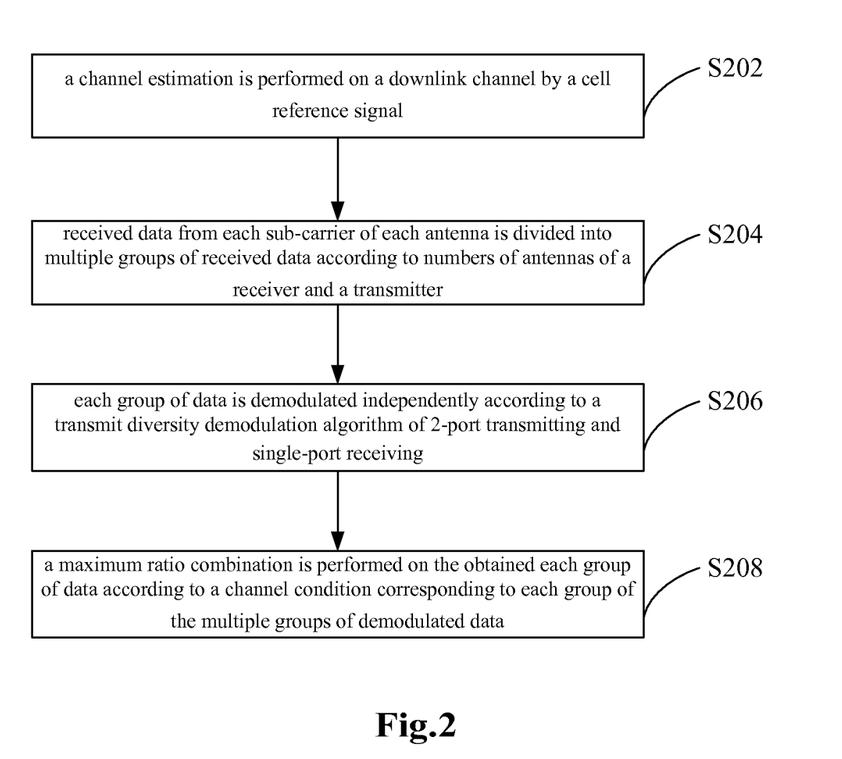
FIG. 2 is an implemented flow chart of a demodulating method based on a downlink transmit diversity mode in a LTE system according to an embodiment of the present invention.

FIG. 2 shows a flow chart of a demodulating method based on a downlink transmit diversity mode in a LTE system according to an embodiment of the present invention, and the demodulating method comprises the following steps.

Step S202, channel estimation is performed on a downlink channel by a cell reference signal, so as to obtain channel estimation values.

Step S204, received data from each sub-carrier of each receiving antenna is divided into multiple groups of received data according to numbers of antennas of a receiver and a transmitter.

Step S206, each group of the multiple groups of received data is demodulated independently according to a demodulation algorithm of two-port transmitting and single-port receiving, so as to obtain a corresponding group of demodulated data.

Step S208, for multiple groups of demodulated data corresponding to same transmitted data, a maximum ratio combination is performed on the multiple groups of demodulated data according to a channel condition corresponding to each group of the multiple groups of demodulated data, so as to obtain a final demodulated data value corresponding to the same transmitted data.

In the embodiment, the channel estimation is performed on the downlink channel by the cell reference signal first, the received data from each sub-carrier of each receiving antenna is divided into groups according to the numbers of the antennas of the receiver and the transmitter, the demodulated data is obtained from each group of received data by a 2-port decoding method, and then the maximum ratio combination is performed on each group of demodulated data preferably by a SINR corresponding to the each group, thus the LTE communication system can improve the performance of the system by a space diversity technology when the transmission rate of the system is ensured.

Figure 3:
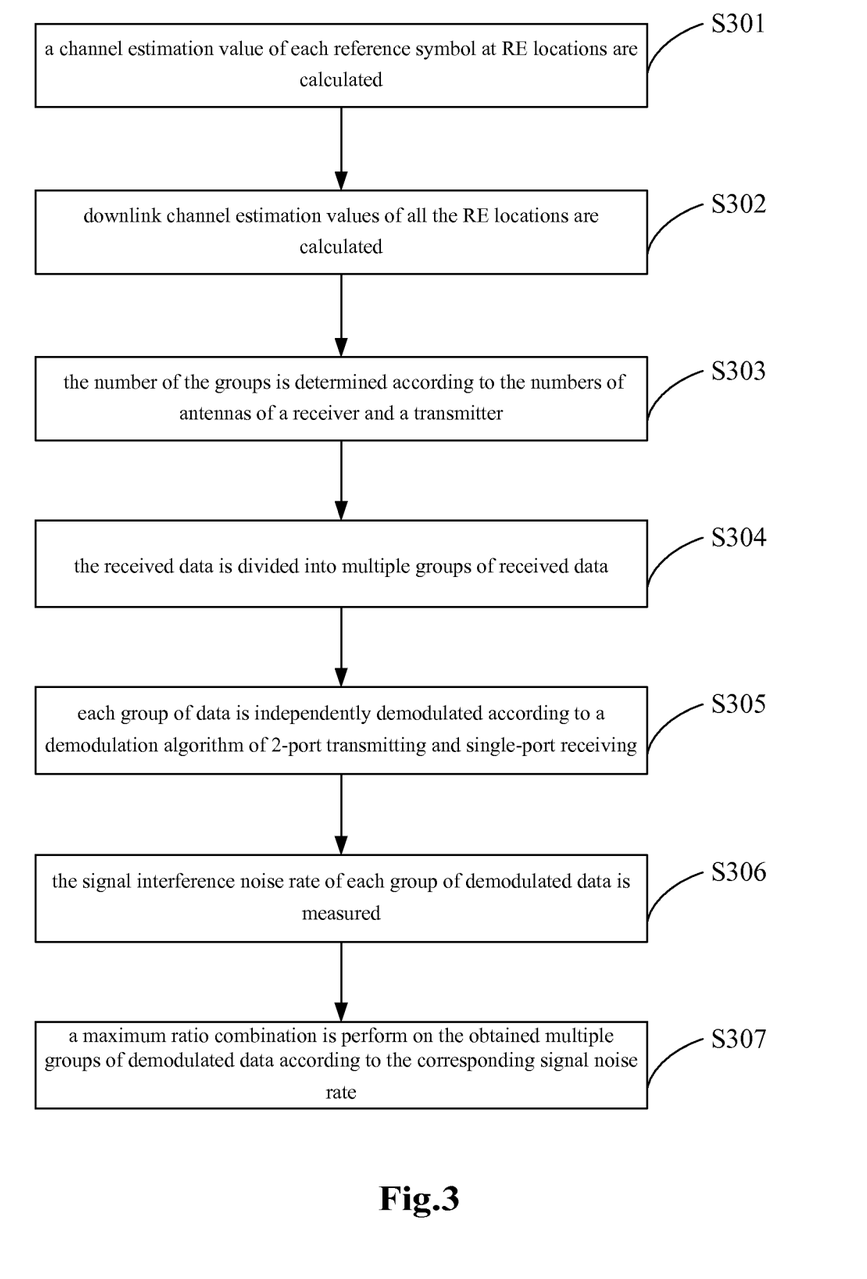
FIG. 3 is an implemented flow chart of a demodulating method based on the downlink transmit diversity mode in a LTE system according to a preferred embodiment of the present invention.

FIG. 3 shows an implemented flow chart of a demodulating method based on a downlink transmit diversity mode in a LTE system according to a preferred embodiment of the present invention, and the demodulating method comprises the following steps.

Step S301, each receiving antenna calculates, at fixed RE (Resource Element) locations, channel estimation values at the locations by received data and a known cell reference signal, wherein the RE locations are time-frequency locations at which the cell reference signals transmitted by each transmission antenna locate, and the method of the calculation comprises but is not limited to a Least Square (LS) algorithm.

Step S302, according to the result of the previous step, the channel estimation values of all downlink REs are obtained by an interpolation algorithm, wherein the interpolation algorithm comprises but is not limited to a linear interpolation algorithm.

Step S303, the number K of groups is determined according to the numbers of antennas of the receiver and the transmitter, and $$K = M \cdot \frac{N}{2},$$

wherein N, M are the numbers of the antennas of the receiver and the transmitter respectively.

Step S304, received data from each sub-carrier of each receiving antenna based on a transmit diversity mode is divided into K groups of received data based on a principle that data from two neighboring sub-carriers of a same receiving antenna is in one group.

Step S305, each group of the multiple groups of received data is independently demodulated according to an SFBC demodulation algorithm of two-port transmitting and single-port receiving, and a corresponding group of demodulated data is obtained.

In the embodiment, each group of received data is independently demodulated, and specifically, the demodulation algorithm used for each group of received data is as follows.

It is assumed that an arbitrary group of received data obtained from the dividing in Step S304 is $[r_0 \ r_1]^T$, and a corresponding transmitted data is $[S_0 \ S_1]^T$, data encoded by a transmit diversity module of the transmitter is expressed as a matrix form $$\frac{1}{\sqrt{2}} \begin{bmatrix} S_0 & S_1 \\ -S_1^* & S_0^* \end{bmatrix},$$

wherein each column represents data symbols mapped at each antenna port of a same RE, and each row represents data symbols mapped at each RE of a same port, wherein $[\ ]^T$ represents a transposition operation of a matrix. Then the demodulated data at the receiver is estimated to be:

$$\begin{cases} \tilde{S}_0 = \sqrt{2} \frac{r_0 h_{11}^* + r_1^* h_{21}}{\|h_{11}\|^2 + \|h_{21}\|^2} \\ \tilde{S}_1 = \sqrt{2} \frac{-r_0 h_{21}^* + r_1^* h_{11}}{\|h_{11}\|^2 + \|h_{21}\|^2} \end{cases}$$

In the above, $h_{ij}$ represents a channel estimation value from transmission port i (i=1, . . . , N) to receiving port t j (j=1, . . . , M) of the group, $\|h_{11}\|$ represents the module of complex number $h_{11}$.

Therefore, K groups of demodulation data $[\tilde{S}_0 \ \tilde{S}_1]^T$ are obtained in total.

Step S306, signal-to-interference plus noise ratio $SINR_i$ of each group of demodulated data is measured, wherein i=1, . . . , K.

Specifically, the obtained $SINR_i$ depends on the value of the channel power of a corresponding sub-carrier and interference plus noise power. The measurement algorithm for calculating the $SINR_i$ comprises but is not limited to the method described in the embodiment which assumes the interference plus noise power is same for each group, and the SINR is determined according to the value of amplitudes of the channel estimation values of the group, which is specifically as follows.

$$SINR_i = \frac{\|h_{11}\|^2 + \|h_{21}\|^2}{2\sigma^2},$$

wherein $h_{11}$ and $h_{21}$ are respectively channel estimation values from a first transmission port and a second transmission port of a same group to a first receiving port, and $\sigma^2$ is the value of the interference plus noise power.

Step S307, for multiple groups of demodulated data corresponding to same transmitted data, a maximum ratio combination is performed on the multiple groups of demodulated data according to the SINR corresponding to each group of the multiple groups of demodulated data, and a corresponding final demodulated data value corresponding to the same transmitted data is obtained, The rules are described below.

1) In a case the transmitter has 2 ports

All the K=M groups of demodulated data are corresponding to the same transmitted data $[S_0 \ S_1]^T$, therefore a maximum ratio combination coefficient $\lambda_i$ (wherein, i=1, . . . , M) of each group may be obtained by the following formula:

$$\sum_{i=1}^{K} \lambda_i = 1$$

$$\lambda_i / \lambda_j = SINR_i / SINR_j,$$

wherein i, j=1, . . . , K.

Therefore, the final demodulated data value is:

$$[\tilde{S}_0 \ \tilde{S}_1]^T = \sum_{i=1}^{M} \lambda_i \cdot [\tilde{S}_{i,0} \ \tilde{S}_{i,1}]^T.$$

2) In a case that the transmitter has 4 ports

Among all K=2M groups of demodulated data, M groups of demodulated data of a first unit are corresponding to transmitted data $[S_0 \ S_1]^T$, and M groups of demodulated data of a second unit are corresponding to transmitted data $[S_2 \ S_3]^T$, therefore, maximum ratio combination coefficient $\lambda_{p,i}$ (wherein, p is 0 or 1 respectively corresponding to the M groups of demodulated data of the first unit or the M groups of demodulated data of the second unit, and p=0 or 1, i=1, . . . , M) of each group of each unit can be obtained according to the following formula:

$$\sum_{i=1}^{M} \lambda_{p,i} = 1$$

$$\lambda_{p,i} / \lambda_{p,j} = SINR_{p,i} / SINR_{p,j},$$

wherein p=0 or 1, and i=1, . . . , M.

From which, the obtained final demodulated data values are:

$$[\tilde{S}_0 \ \tilde{S}_1]^T = \sum_{i=1}^{M} \lambda_{0,i} \cdot [\tilde{S}_{0,i,0} \ \tilde{S}_{0,i,1}]^T$$

$$[\tilde{S}_2 \ \tilde{S}_3]^T = \sum_{i=1}^{M} \lambda_{1,i} \cdot [\tilde{S}_{1,i,0} \ \tilde{S}_{1,i,1}]^T.$$

Figure 4:
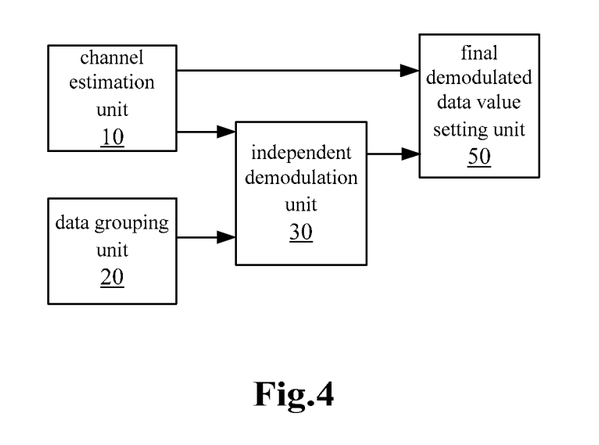
FIG. 4 is a block diagram of a demodulating apparatus based on the downlink diversity transmission mode in the LTE system according to an embodiment of the present invention.

FIG. 4 is a block diagram of a demodulating apparatus based on a downlink transmit diversity mode according to an embodiment of the present invention, and the apparatus comprises:

a channel estimation unit 10, configured to perform a channel estimation on a downlink channel by a cell reference signal;

a data grouping unit 20, configured to divide received data from each sub-carrier based on the transmit diversity mode of each receiving antenna into multiple groups of received data, according to numbers of antennas of a transmitter and a receiver;

an independent demodulation unit 30, which is connected to channel estimation unit 10 and the data grouping unit 20, configured to independently demodulate, according to a demodulation algorithm of two-port transmitting and single-port receiving, each group of the multiple groups of received data received from the data grouping unit 20, so as to obtain a corresponding group of demodulated data; and a final demodulated data value setting unit 50, which is connected to the independent demodulation unit 30 and the channel estimation unit 10, configured to, for multiple groups of demodulated data corresponding to same transmitted data, perform a maximum ratio combination on the multiple groups of demodulated data according to a channel condition corresponding to each group of the multiple groups of demodulated data, so as to obtain a final demodulated data value corresponding to the same transmitted data.

In the embodiment, the channel estimation is performed on the downlink channel by the cell reference signal first, the received data from each sub-carrier of each receiving antenna is divided into groups according to the numbers of the antennas of the receiver and the transmitter, the demodulated data is obtained from each group of received data by a 2-port decoding method, and then the maximum ratio combination is performed on each group of demodulated data preferably by a SINR corresponding to the each group, thus the LTE communication system can improve the performance of the system by a space diversity technology when the transmission rate of the system is ensured.

Figure 5:
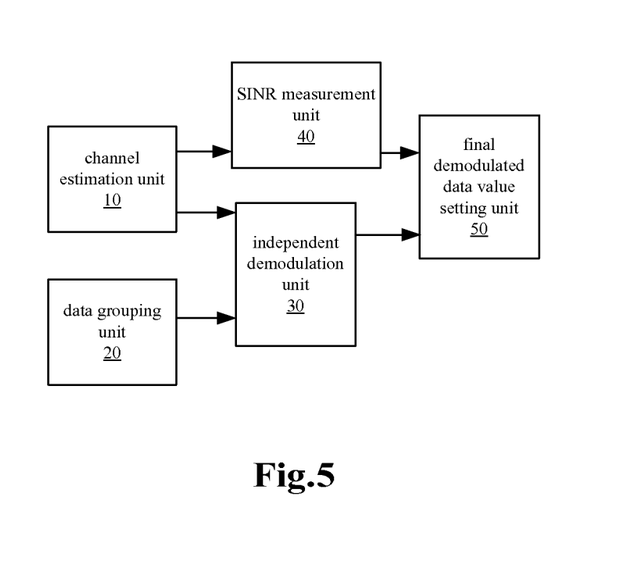
FIG. 5 is a preferred block diagram of a demodulating apparatus based on the downlink diversity transmission mode in the LTE system according to a preferred embodiment of the present invention.

FIG. 5 is a preferred block diagram of a demodulating apparatus based on a downlink transmit diversity mode in a LTE system according to a preferred embodiment of the present invention. As shown in FIG. 5, the block diagram is fundamentally similar to that shown in FIG. 4, with exception that the structure in FIG. 5 also comprises a SINR measurement unit 40, which is connected between the channel estimation unit 10 and the final demodulated data value setting unit 50 and measures signal-to-interference plus noise ratio SINR$_i$ of each group of demodulated data, wherein i=1, ..., K.

Preferably, the final demodulated data value setting unit 50 performs a maximum ratio combination on multiple groups of demodulated data according to the SINR$_i$ corresponding to each group of demodulated data measured by the SINR measurement unit, so as to obtain the final demodulated data value corresponding to a same transmitted data, wherein the maximum ratio combination is performed by the following formula:

$$\sum_{i=1}^{K} \lambda_i = 1$$

$$\lambda_i / \lambda_j = SINR_i / SINR_j,$$

wherein $\lambda_i, \lambda_j$ represent maximum ratio combination coefficients of an $i^{th}$ and a $j^{th}$ groups, i, j=1, ..., K.

Therefore, the final demodulated data value corresponding to the same transmitted data $$[\tilde{S}_0 \; \tilde{S}_1]^T = \sum_{i=1}^{K} \lambda_i \cdot [\tilde{S}_{i,0} \; \tilde{S}_{i,1}]^T$$

is obtained, wherein $[\tilde{S}_{i,0} \; \tilde{S}_{i,1}]^T$ represents the $i^{th}$ group of demodulated data.

In the embodiment, preferably, the data grouping unit 20 determines number K of groups according to the numbers of antennas of a receiver and a transmitter, and divides the received data into K groups of received data according to a principle that data from two neighboring sub-carriers of a same receiving antenna is in one group, wherein $$K = M \cdot \frac{N}{2},$$

and N and M are the numbers of the antennas of the receiver and the transmitter respectively.

Moreover, in the embodiment shown in FIG. 5, preferably, the SINR measurement unit 40 sets interference noise power in each group as equal, so as to determine the signal-to-interference plus noise ratio SINR$_i$ according to the value of amplitudes of the channel estimation values of each group.

In summary, the method and the apparatus for demodulating data base on the downlink transmit diversity mode of the LTE system proposed by the present invention can ensure the performance of the system adopting the diversity algorithm in situations of various kinds of antenna configurations, reduce cost and the complexity of devices in a practical application, and is very easy for project implementation.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for demodulating data based on a downlink transmit diversity mode in a LTE system, comprising:
   performing channel estimation on a downlink channel by using a cell reference signal, so as to obtain channel estimation values;
   dividing received data from sub-carriers of each receiving antenna based on a transmit diversity mode into multiple groups of received data according to numbers of antennas of a transmitter and a receiver;
   performing an independent demodulation on each group of the multiple groups of received data separately according to a demodulation algorithm of two-port transmitting and single-port receiving, so as to obtain a corresponding group of demodulated data; and
   for multiple groups of demodulated data corresponding to same transmitted data, performing a maximum ratio combination on the multiple groups of demodulated data according to a channel condition corresponding to each group of the multiple groups of demodulated data, so as to obtain a final demodulated data value corresponding to the same transmitted data;
   wherein the step of dividing the received data from sub-carriers of each receiving antenna based on the transmit diversity mode into the multiple groups of received data comprises:
   classifying the data into K groups by classifying data from two neighboring sub-carriers of a same receiving antenna into one group, wherein $$K = M \cdot \frac{N}{2},$$

and N and M represent the numbers of the antenna of the transmitter and the receiver respectively.

2. The method according to claim 1, wherein the step of for multiple groups of demodulated data corresponding to same transmitted data, performing a maximum ratio combination on the multiple groups of demodulated data according to a channel condition corresponding to each group of the multiple groups of demodulated data comprises:

measuring signal-to-interference plus noise ratio $SINR_i$ of each group of demodulated data according to the channel estimation values of the downlink channel, wherein i=1, ..., K, and K is the number of groups of the multiple groups of received data; and performing the maximum ratio combination on the multiple groups of demodulated data according to the signal-to-interference plus noise ratio $SINR_i$ corresponding to each group of demodulated data, so as to obtain the final demodulated data value corresponding to the same transmitted data.

3. The method according to claim 2, wherein the maximum ratio combination is performed by the following formula:

$$\sum_{i=1}^{K} \lambda_i = 1$$

$$\lambda_i / \lambda_j = SINR_i / SINR_j,$$

wherein $\lambda_i$, $\lambda_j$ represent maximum combination coefficients of an $i^{th}$ and a $j^{th}$ groups respectively, i, j=1, ..., K, and the obtained final demodulated data value corresponding to the same transmitted data satisfies:

$$[\tilde{S}_0 \ \tilde{S}_1]^T = \sum_{i=1}^{K} \lambda_i \cdot [\tilde{S}_{i,0} \ \tilde{S}_{i,1}]^T,$$

wherein $[\tilde{S}_0 \ \tilde{S}_1]^T$ represents the final demodulated data value corresponding to the same transmitted data, and $[\tilde{S}_{i,0} \ \tilde{S}_{i,1}]^T$ represents the $i^{th}$ group of demodulated data.

4. The method according to claim 2, wherein the signal-to-interference plus noise ratio $SINR_i$ of each group of demodulated data is determined by the following formula:

$$SINR_i = \frac{\|h_{11}\|^2 + \|h_{21}\|^2}{2\sigma^2},$$

wherein $h_{11}$ and $h_{21}$ are respectively the channel estimation values from a first transmission port and a second transmission port of a same group to a first receiving port, $\sigma^2$ is interference noise power and set to be same for each group, and $\| \ \|$ represents a module operation.

5. An apparatus for demodulating data based on a downlink transmit diversity mode in a LTE system, comprising:

a channel estimation unit, configured to perform a channel estimation on a downlink channel by using a cell reference signal so as to obtain channel estimation values;

a data grouping unit, configured to divide received data from each sub-carrier based on the transmit diversity mode of each receiving antenna into multiple groups of received data, according to numbers of antennas of a transmitter and a receiver;

an independent demodulation unit, which is connected to the channel estimation unit and the data grouping unit, configured to demodulate each group of the multiple groups of received data separately by using a demodulation algorithm of two-port transmitting and single-port receiving, so as to obtain a corresponding group of demodulated data; and a final demodulated data value setting unit, which is connected to the channel estimation unit and the independent demodulation unit, configured to, for multiple groups of demodulated data corresponding to same transmitted data, perform a maximum ratio combination on the multiple groups of demodulated data according to a channel condition corresponding to each group of the multiple groups of demodulated data, so as to obtain a final demodulated data value corresponding to the same transmitted data;

wherein that the data grouping unit divides the received data from the sub-carriers based on the transmit diversity mode of each receiving antenna into the multiple groups of received data comprises:

classifying the data into K groups by classifying data from two neighboring sub-carriers of a same receiving antenna into one group, wherein $$K = M \cdot \frac{N}{2},$$

and N and M represent the numbers of the antenna of the transmitter and the receiver respectively.

6. The apparatus according to claim 5, wherein the apparatus further comprises a signal-to-interference plus noise ratio measurement unit, configured to measure signal-to-interference plus noise ratio $SINR_i$ of each group of demodulated data according to the channel estimation values of the downlink channel measured by the channel estimation unit, wherein i=1, ..., K, and K is the number of the multiple groups of the received data, and wherein for the multiple groups of demodulated data corresponding to same transmitted data, the final demodulated data value setting unit performs a maximum ratio combination on multiple groups of demodulated data according to the $SINR_i$ corresponding to each group of demodulated data measured by the signal-to-interference plus noise ratio measurement unit, so as to obtain the final demodulated data value corresponding to the same transmitted data.

7. The apparatus according to claim 6, wherein the final demodulated data value setting unit performs the maximum ratio combination operation by the following formula:

$$\sum_{i=1}^{K} \lambda_i = 1$$

$$\lambda_i / \lambda_j = SINR_i / SINR_j,$$

wherein $\lambda_i$ and $\lambda_j$ represent maximum ratio combination coefficients of an $i^{th}$ group and a $j^{th}$ group respectively, i, j=1, ..., K, and the obtained final demodulated data value corresponding to the same transmitted data satisfies the following equation:

$$[\tilde{S}_0 \ \tilde{S}_1]^T = \sum_{i=1}^{K} \lambda_i \cdot [\tilde{S}_{i,0} \ \tilde{S}_{i,1}]^T,$$

wherein $[\tilde{S}_0 \ \tilde{S}_1]^T$ represents the final demodulated data value corresponding to the same transmitted data, and $[\tilde{S}_{i,0} \ \tilde{S}_{i,1}]^T$ represents an $i^{th}$ group of demodulated data.

8. The apparatus according to claim 6, wherein the signal-to-interference plus noise ratio measurement unit determines the signal-to-interference plus noise ratio $SINR_i$ of each group of demodulated data by the following formula:

$$SINR_i = \frac{\|h_{11}\|^2 + \|h_{21}\|^2}{2\sigma^2},$$

wherein $h_{11}$ and $h_{21}$ are respectively the channel estimation values from a first transmission port and a second transmission port of a same group to a first receiving port, $\sigma^2$ is interference noise power and set to be same for each group, and $\| \ \|$ represents a module operation.

9. The method according to claim 3, wherein the signal-to-interference plus noise ratio $SINR_i$ of each group of demodulated data is determined by the following formula:

$$SINR_i = \frac{\|h_{11}\|^2 + \|h_{21}\|^2}{2\sigma^2},$$

wherein $h_{11}$ and $h_{21}$ are respectively the channel estimation values from a first transmission port and a second transmission port of a same group to a first receiving port, $\sigma^2$ is interference noise power and set to be same for each group, and $\| \ \|$ represents a module operation.

10. The apparatus according to claim 7, wherein the signal-to-interference plus noise ratio measurement unit determines the signal-to-interference plus noise ratio $SINR_i$ of each group of demodulated data by the following formula:

$$SINR_i = \frac{\|h_{11}\|^2 + \|h_{21}\|^2}{2\sigma^2},$$

wherein $h_{11}$ and $h_{21}$ are respectively the channel estimation values from a first transmission port and a second transmission port of a same group to a first receiving port, $\sigma^2$ is interference noise power and set to be same for each group, and $\| \ \|$ represents a module operation.

* * * * *